(12) United States Patent
Klesper et al.

(10) Patent No.: US 8,000,678 B1
(45) Date of Patent: Aug. 16, 2011

(54) INFORMATION PROVISIONING FOR EMERGENCY CALLS

(75) Inventors: Stevan A. Klesper, Gardner, KS (US);
Arun Santharam, Olathe, KS (US);
Timothy Kevin McGinnis, Overland Park, KS (US); Lyle Walter Paczkowski, Mission Hills, KS (US);
Ray N. Durkin, De Soto, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 887 days.

(21) Appl. No.: 11/764,665

(22) Filed: Jun. 18, 2007

(51) Int. Cl.
*H04M 11/04* (2006.01)

(52) U.S. Cl. .................. 455/404.2; 455/404.1; 709/207; 709/238; 709/240; 709/206

(58) Field of Classification Search .................. 455/404, 455/404.1, 404.2; 607/5, 60, 59; 705/1, 705/2; 709/207, 238, 240, 206; 600/523
See application file for complete search history.

(56) References Cited

U.S. PATENT DOCUMENTS

| | | | |
|---|---|---|---|
| 6,829,478 B1* | 12/2004 | Layton et al. | 455/428 |
| 6,993,118 B2 | 1/2006 | Antonucci et al. | |
| 7,440,442 B2* | 10/2008 | Grabelsky et al. | 370/352 |
| 2005/0085257 A1* | 4/2005 | Laird et al. | 455/550.1 |
| 2005/0282518 A1* | 12/2005 | D'Evelyn et al. | 455/404.1 |
| 2006/0159235 A1 | 7/2006 | Eisner et al. | |
| 2006/0178128 A1* | 8/2006 | Eaton et al. | 455/404.1 |
| 2007/0103294 A1* | 5/2007 | Bonecutter et al. | 340/539.18 |

* cited by examiner

*Primary Examiner* — Meless N Zewdu
*Assistant Examiner* — Mahendra Patel

(57) ABSTRACT

An emergency service system receives a call transmitted from a calling device to an emergency service to obtain assistance for a person, receives from a responder device a personal information request for personal information associated with the person, wherein the personal information request includes a personal identification read by the responder device that identifies the person, determines if the responder device is authorized to request the personal information, and transfers the personal information to the responder device if the responder device is authorized.

17 Claims, 9 Drawing Sheets

INFORMATION PROVISIONING FOR EMERGENCY CALLS

BACKGROUND OF THE INVENTION

1. Field of the Invention

This invention relates to the field of telecommunications, and more particularly, to provisioning information for emergency calls.

2. Description of the Prior Art

Telecommunication carriers are required by government regulations to provide emergency calling services to their customers. In the United States and Canada, 9-1-1 is the official emergency phone number that callers can dial in order to reach dispatch personnel at public safety answering points (PSAP). When a caller dials 911 from a telephone, the call is routed by a carrier to receiving equipment at a PSAP facility. A dispatcher at the facility answers the call and assists the caller with their emergency.

Often times, dispatchers must dispatch response personnel to the scene of an emergency to render assistance to callers or others involved in the emergency. In the past, dispatchers had to ask a caller for their location. Over time, most telecommunication carriers developed the capability to automatically determine the location of landline callers. For instance, landline callers can be located based on their phone number.

Most carriers have also implemented solutions for determining the location of mobile callers. In the prior art, wireless carriers have employed several different solutions to locate callers in need of emergency service, such as providing the location of the cell tower servicing a call to a PSAP. In another example, wireless carriers employ triangulation techniques to pinpoint the location of a caller. In yet another example, mobile devices with global position system (GPS) capability provide their GPS coordinates to the carrier, and in turn, to the PSAP.

While it is possible to determine the location of a caller, present systems do not provide response personnel with other information that could improve the emergency response. For example, response personnel are not provided with information related to buildings or other such dwellings near the scene of an emergency.

In addition, it would be helpful to provide response personnel with information related to the people requiring emergency assistance. Some systems exist that store health and other personal information on behalf of customers. Response personnel can query the systems for the information using personal identifiers, such as names or social security numbers. The information is then returned to the response personnel and can be used it improve the emergency response. Unfortunately, such systems are open to abuse. For example, the personal health information belonging to a customer can be obtained without consent or authorization. As a result, privacy concerns have limited the popularity and implementation of such systems.

SUMMARY OF THE INVENTION

Embodiments of the invention solve the above problems and other problems by providing response personnel with information related to the subjects of emergency calls, while still protecting the privacy of the information.

In an embodiment, an emergency service system receives a call transmitted from a calling device to an emergency service to obtain assistance for a person. The emergency service system also receives from a responder device a personal information request for information associated with the person, wherein the personal information request includes a personal identification read by the responder device that identifies the person. The emergency service system determines if the responder device is authorized to request the information. The emergency service system transfers the information to the responder device if the responder device is authorized.

In some embodiments, first responders operating a device read a personal identification from an identification device on the person that is the subject of an emergency call. A request is transmitted to an emergency service for information stored in association with the personal identification. The request is only granted if the device used by the first responder can be authorized. In some embodiments, the request is only authorized if the device is proximate to the calling device that initiated the emergency call. In other embodiments, the request is only authorized if made within a certain time limit.

BRIEF DESCRIPTION OF THE DRAWINGS

The same reference number represents the same element on all drawings.

DETAILED DESCRIPTION OF THE INVENTION

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
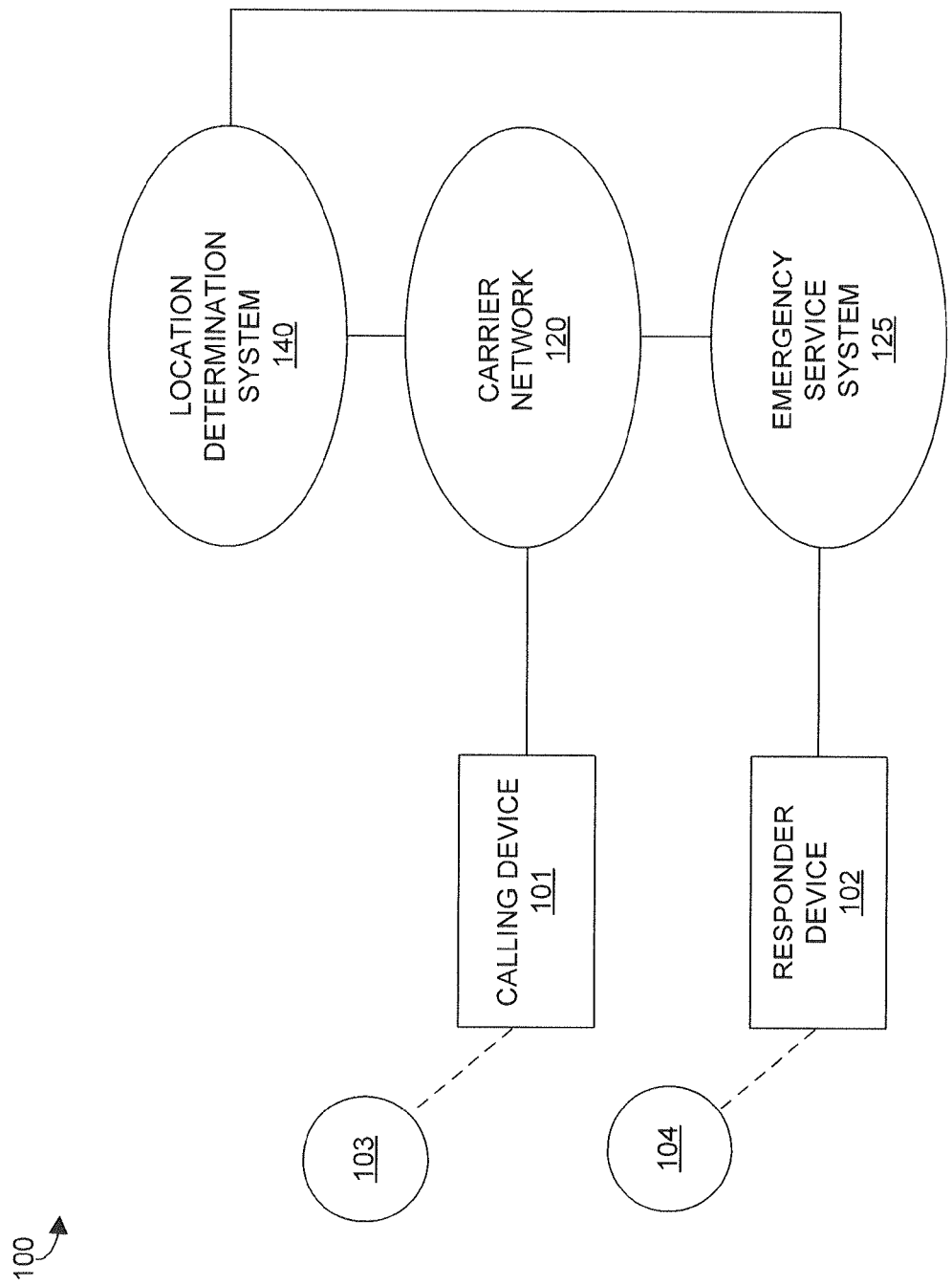
FIG. 1 illustrates a communication network in an embodiment of the invention.

FIG. 1 illustrates communication network 100 in an embodiment of the invention. In FIG. 1, communication network 100 includes calling device 101, carrier network 120, emergency service system 125, location determination system 140, and response personnel 102. Calling device 101 is in communication with carrier network 120. Carrier network 120 is coupled to both emergency service system 125 and location determination system 140. Emergency service system 125 is in communication with response personnel 102. Emergency service system 125 is also in communication with location determination system 140.

Calling device 101 is any device capable of placing emergency calls to carrier network 120, such as a telephone, mobile phone, or a personal computer, as well as other types of calling devices.

Carrier network 120 is any network or collection of networks capable of receiving emergency calls from calling device 101 and connecting the calls to emergency service system 125. Examples of carrier networks include wireless communication networks, wireline communication networks, or packet communication networks, as well as any combination or variation thereof. Carrier network 120 is capable of communicating with calling device 101, emergency service system 125, and location determination system 140.

Location determination system 140 is any system or collection of systems capable of providing location provisioning services for emergency calls placed to carrier network 120. Location determination system 140 is capable of communicating with both carrier network 120 and emergency service system 125 to determine the location of emergency calls.

Responder device 102 could be any device, such as a mobile phone, a laptop computer, or a tablet computer, capable of communicating with emergency service system 125. Responder device 102 could communicate with emergency service system 125 in a manner well known in the art, such as via a data link, a messaging system, or the like.

Emergency service system 125 is any system, network, or collection of networks capable of receiving and terminating an emergency call from carrier network 120. Furthermore, emergency service system 125 is any system or network capable of communicating with responder device 102. In addition, emergency service system 125 is capable of storing information for a person in association with an identifier for that person, such as a caller identification, a personal identification, or the like. Emergency service system 125 can store individual files, documents, or records, as well as other types of data or information, for multiple people. Each individual item of information, whether a file, a document, a record, or the like, can be stored in association with an identifier. The information could comprise health information or medical treatment information. In an option, a standardized record could exist for each person represented in emergency service system 125. The standardized record could be data-filled by each person via a network user interface, such as a web browser.

Figure 2:
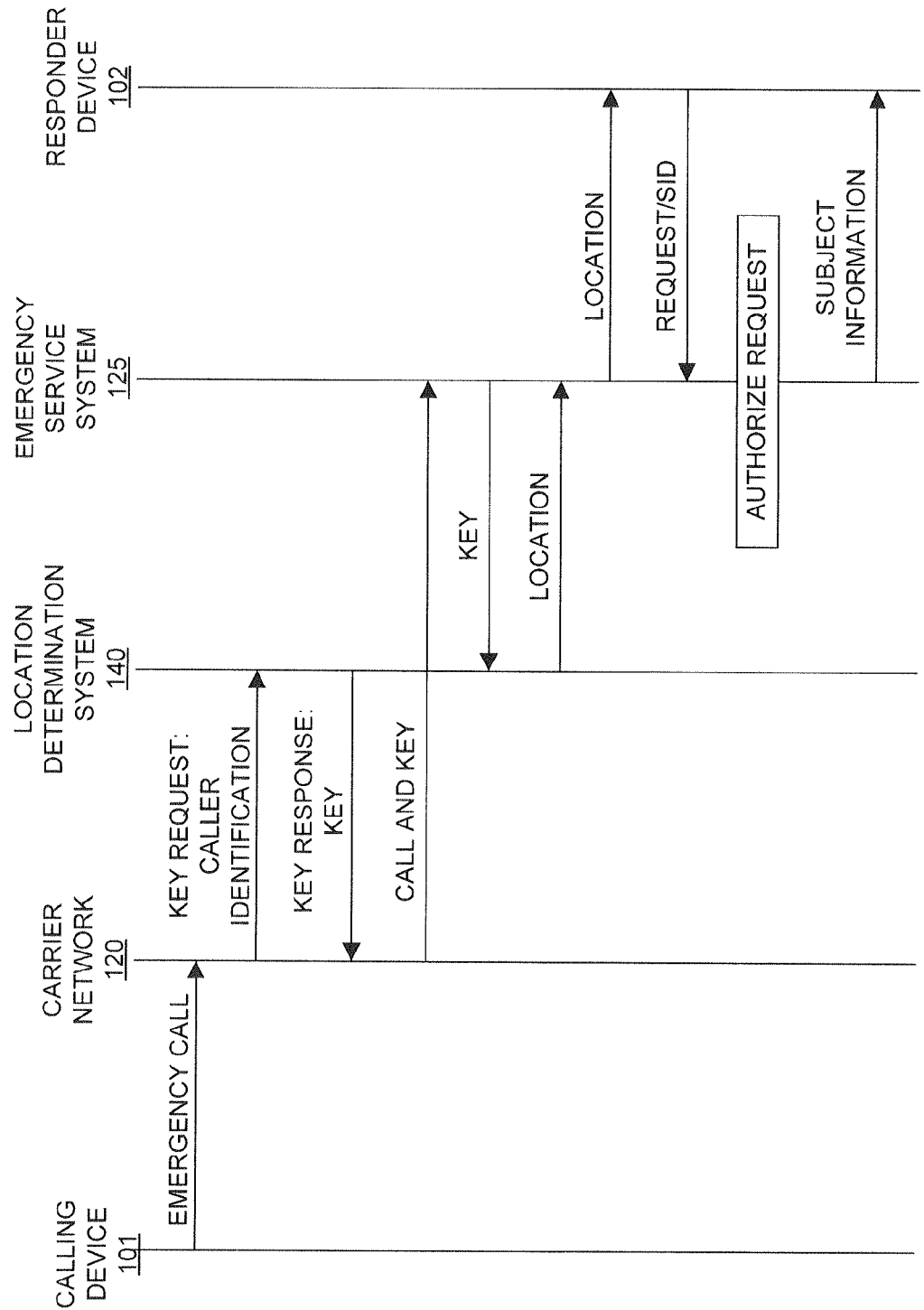
FIG. 2 illustrates a call flow diagram in an embodiment of the invention.

FIG. 2 is a call flow diagram that illustrates the operation of communication network 100. As shown in FIG. 2, a caller 103 operating calling device 101 places an emergency call to carrier network 120 to obtain assistance for person 104. Person 104 is considered the subject of the call. Typically, the caller 103 would dial 9-1-1 in order to place the call. Typically, the calling device 101 used by the caller 103 transmits a caller identification, such as the phone number associated with the calling device, to carrier network 120. Carrier network 120 receives the emergency call and transfers a key request to location determination system 140. The key request includes the caller identification.

Location determination system 140 processes the request to select a key that will be used going forward to identify the call. Location determination system 140 returns a key response to carrier network 120 indicating the key. Location determination system 140 also stores the caller identification in association with the key for later queries by other systems.

Carrier network 120 then transfers signaling to emergency service system 125 to connect the call. The signaling typically includes the key. Upon receiving the call and the signaling, emergency service system 125 transfers a location query to location determination system 140. The location query indicates the key. Location determination system 140 processes the key to determine the caller identification associated with the key.

Having determined the caller identification, location determination system 140 processes the caller identification to determine the location of calling device 101, such as by employing GPS, triangulation, or other such location schemes. Location determination system 140 then returns a query response to emergency service system 125 that indicates the location of calling device 101. A dispatcher radios or otherwise communicates the location of the call to response personnel responding to the emergency.

Further in this embodiment, responder device 102 is capable of reading a personal identification from an identification device located on or with the person 104 that is the subject of the emergency call. The personal identification could be inscribed or encoded on an identification tag, bracelet, radio frequency identification chip, bar code, or the like. Responder device 102 could be capable of directly reading or scanning such a personal identification. Optionally, a second device could read or scan the personal identification and communicate the personal identification to responder device 102. For instance, a bar code scanner could be utilized to scan a bar code for a personal identification and transfer the identification to responder device 102 over a well known communication link.

After obtaining the personal identification, responder device 102 transfers a personal information request to emergency service system 125 for information related to the person 104 that is the subject of the call. The personal information request includes the personal identification of the person 104. Emergency service system 125 receives the personal information request and processes the request to determine if responder device 102 is allowed to make the request.

In one example, the request identifies the location of responder device 102. Emergency service system 125 processes the location of responder device 102 with the location of calling device 101 to determine if responder device 102 is proximate to calling device 101. Responder device 102 could be considered proximate to calling device 101 if within a certain distance from the current location of calling device 101. Optionally, responder device 102 could be considered proximate to calling device 101 if within a certain distance of the past location of calling device 102 when the emergency call was placed. Responder device 102 is allowed if proximate to calling device 101. Responder device 102 could be denied the request if not proximate to calling device 101. Emergency service system 125 could obtain the location of responder device 102 from responder device 102, as well as from some other system, such as location determination system 140.

In another example, emergency service system 125 initiates a timer upon receiving the emergency call. Within the expiration of the timer, emergency service system 125 allows information requests from responder device 102. Upon receiving an information request from responder device 102, emergency service system 125 checks the timer to determine if the request is received within the acceptable window of time set by the timer. For example, a ten minute window could be opened within which any requests by responder device 102 are allowed. The request by responder device 102 is allowed if made within the window of time. The request is denied if made after the window of time has expired.

If responder device 102 is allowed to make the request, emergency service system 125 processes the request to retrieve the information associated with the personal identification. Emergency service system 125 returns the information to responder device 102. Response personnel can use the information to treat the person 104 that is the subject of the emergency call.

Figure 3:
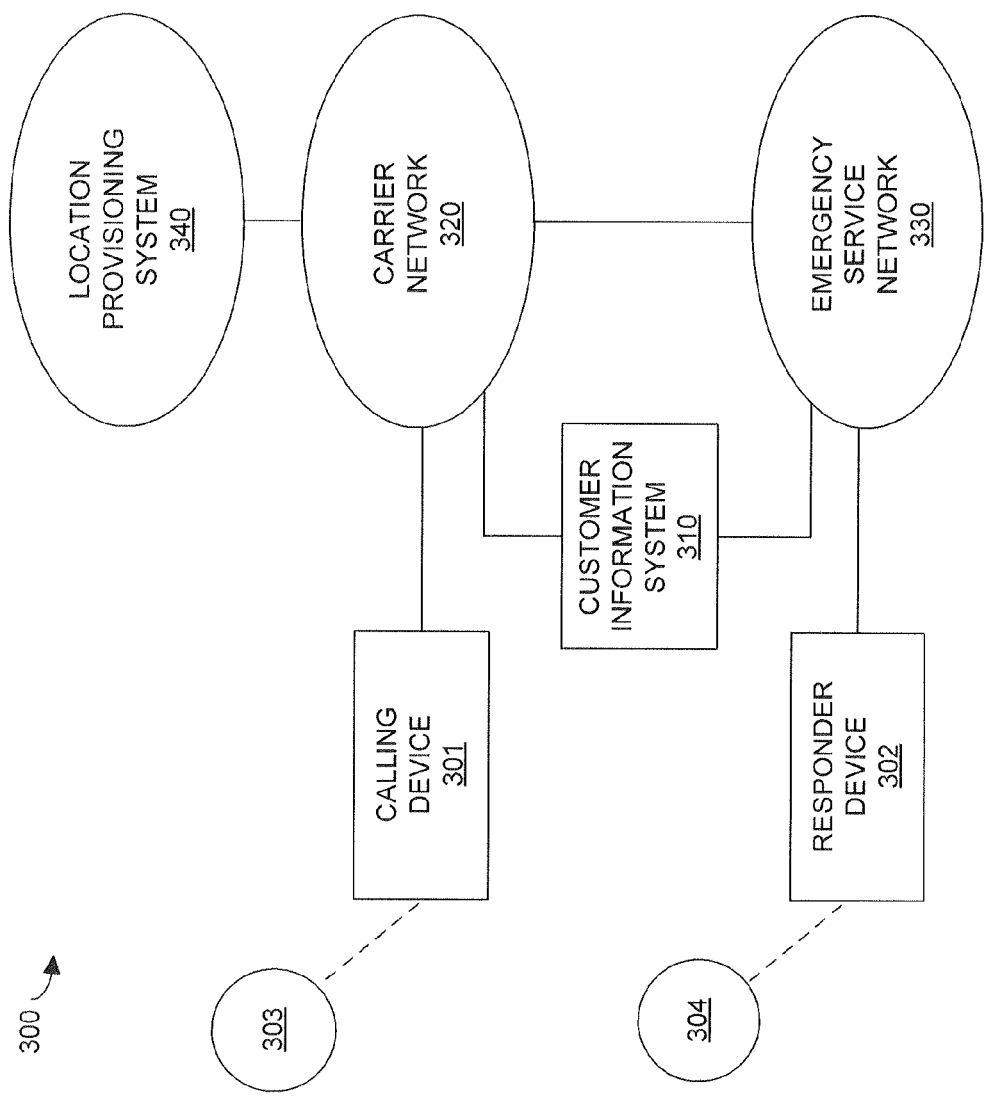
FIG. 3 illustrates a communication network in an embodiment of the invention.

FIG. 3 illustrates communication network 300 in another embodiment of the invention. Communication network 300 includes calling device 301, carrier network 320, emergency service network 330, location provisioning system 340, responder device 302, and customer information system 310. Device 301 is connected to carrier network 320. Carrier network 320 is connected to emergency service network 330, location provisioning system 340, and customer information system 310. Emergency service network 330 is also connected to customer information system 310, as well as responder device 302.

Calling device 301 is any device capable of placing emergency calls to carrier network 320, such as a telephone, mobile phone, or a personal computer, as well as other types of calling devices.

Carrier network 320 is any network or collection of networks capable of receiving emergency calls from calling device 301 and connecting the calls to emergency service network 330. Examples of carrier networks include wireless communication networks, wireline communication networks, or packet communication networks, as well as any combination or variation thereof. Carrier network 320 is capable of communicating with customer information system 310, emergency service network 330, and location provisioning system 340.

Emergency service network 330 is any network or collection of networks capable of receiving and terminating an emergency call from carrier network 320. Furthermore, emergency service network 330 is any network capable of communicating with customer information system 310 and responder device 302.

Location provisioning system 340 is any system or collection of systems capable of providing location provisioning services for emergency calls placed to carrier network 320. Location provisioning system 340 is capable of communicating with both carrier network 320 and emergency service network 330 to determine the location of emergency calls.

Responder device 302 could be any device, such as a mobile phone, a laptop computer, or a tablet computer, capable of communicating with emergency service network 330. Responder device 302 could communicate with emergency service network 330 in a manner well known in the art, such as via a data link, a messaging system, or the like.

Customer information system 310 is any system capable of storing information for a person in association with an identifier for that person, such as a caller identification, a personal identification, or the like. Customer information system 310 can store individual files, documents, or records, as well as other types of data or information, for multiple people. Each item of information, whether a file, a document, or a record, can be stored in association with an identifier. The information can be any type of information associated with the caller or other people requiring emergency assistance, such as health information or medical treatment information. In some cases, the information related to a building or area associated with the caller or the person requiring emergency assistance.

In an embodiment, a standardized record could exist for each person represented in customer information system 310. The standardized record could be data-filled by each person via a network user interface, such as a web browser.

Figure 4:
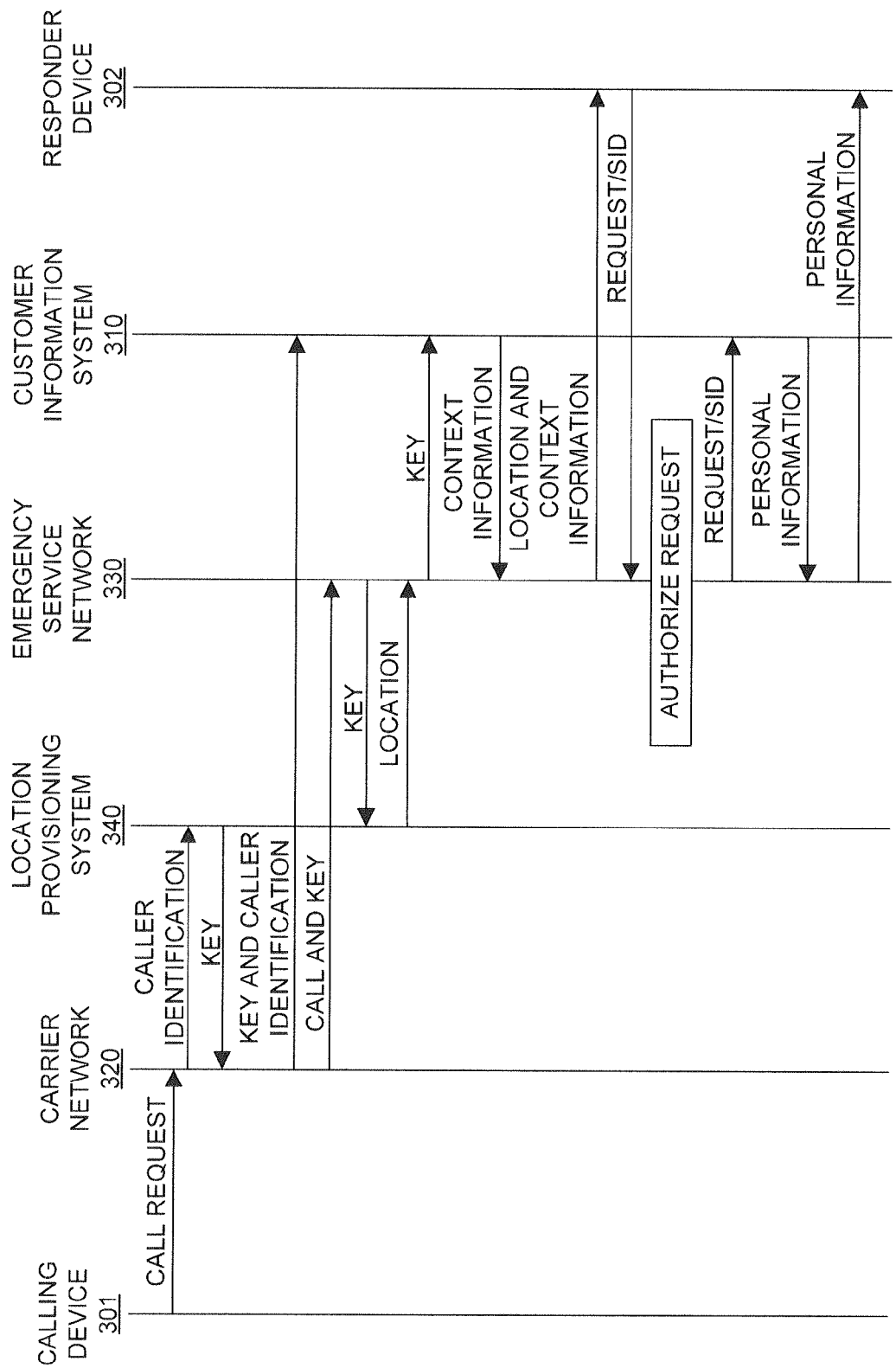
FIG. 4 illustrates a call flow diagram in an embodiment of the invention.

FIG. 4 is a call flow diagram that illustrates the operation of communication network 300 in an embodiment of the invention. A caller 303 operating device 301 places a call to an emergency service to obtain emergency assistance for another person 304, such as by dialing 9-1-1. Device 301 transmits a call request to carrier network 320 that identifies the requested service and includes a caller identification. In some cases, the caller identification identifies a phone number associated with the calling device 301 utilized by the caller. In other cases, the caller identification could identify the caller by a network address, a username, or the like.

In response to the call request, carrier network 320 transmits a key request to location provisioning system 340 that indicates the caller identification. Location provisioning system 340 selects a key from among a group of keys and transmits a response to carrier network 320 that indicates the selected key. Location provisioning system 340 also stores the caller identification in association with the selected key.

Upon receiving the response, carrier network 320 transmits a message to customer information system 310 that indicates both the key and the caller identification. Customer information system 310 receives and processes the message to determine information associated with the caller identification. In this example, information associated with the caller identification is referred to as context information. Customer information system 310 then stores the key in association with the selected context information.

Next, carrier network 320 transfers the call and signaling for the call to emergency service network 330. The signaling for the call identifies the key. Emergency service network 330 transmits a location request to location provisioning system 340 indicating the key. Location provisioning system 340 processes the key to determine the caller identification associated with the key. Location provisioning system 340 then processes the caller identification to determine the location of calling device 301. After determining the location of calling device 301, location provisioning system 340 returns a message to emergency service network 330 with the location of calling device 302.

Subsequently, or nearly simultaneously, emergency service network 330 transfers a request for context information to customer information system 310. The request also indicates the key. Customer information system 310 processes the request to determine the caller identification associated with the key. Upon determining the proper caller identification, customer information system 310 retrieves the context information associated with the caller identification and transmits the context information to emergency service network 330. Emergency service network 330 is then in possession of both the location of calling device 301 and context information associated with the caller. Emergency service network 330 transfers the location and the context information to the responder device 302 operated by response personnel responding to the emergency.

Further in this embodiment, responder device 302 is configured to read a personal identification from an identification device located on or with the person 304 that is the subject of the emergency call. The personal identification could be inscribed or encoded on an identification tag, bracelet, radio frequency identification chip, bar code, or the like. Responder device 302 could be capable of directly reading or scanning such a personal identification. Optionally, a second device could read or scan the personal identification and communicate the personal identification to responder device 302. For instance, a bar code scanner could be utilized to scan a bar code for a personal identification and transfer the identification to responder device 302 over a well known communication link.

After obtaining the personal identification, responder device 302 transfers a request for personal information to emergency service network 330. This request includes the personal identification.

Emergency service network 330 receives the request and processes the request to determine if responder device 302 is allowed to make the request.

In one example, the request identifies the location of responder device 302. Emergency service network 330 processes the location of responder device 302 with the location of calling device 301 to determine if responder device 302 is proximate to calling device 301. Responder device 302 could be considered proximate to calling device 301 if within a certain distance from the current location of calling device 301. Optionally, responder device 302 could be considered proximate to calling device 301 if within a certain distance of the past location of calling device 302 when the emergency call was placed. Responder device 302 is allowed if proximate to calling device 301. Responder device 302 could be denied the request if not proximate to calling device 301. Emergency service network 330 could obtain the location of responder device 302 from responder device 302, as well as from some other system, such as location provisioning system 340.

In another example, emergency service network 330 initiates a timer upon receiving the emergency call. Within the expiration of the timer, emergency service network 330 allows personal information requests from responder device 302. Upon receiving a personal information request from responder device 302, emergency service network 330 checks the timer to determine if the request is received within the acceptable window of time set by the timer. For example, a ten minute window could be opened within which any requests by responder device 302 to customer information system 310 are allowed. The request by responder device 302 is allowed if made within the window of time. The request is denied if made after the window of time has expired.

If responder device 302 is allowed to make the request, emergency service network 300 transfers a request to customer information system 310 indicating the personal identification. Customer information system 310 processes the request to retrieve the personal information associated with the personal identification. Customer information system 310 then transmits the personal information to emergency service network 330. Emergency service network 330 forwards the personal information to responder device 302.

Figure 5:
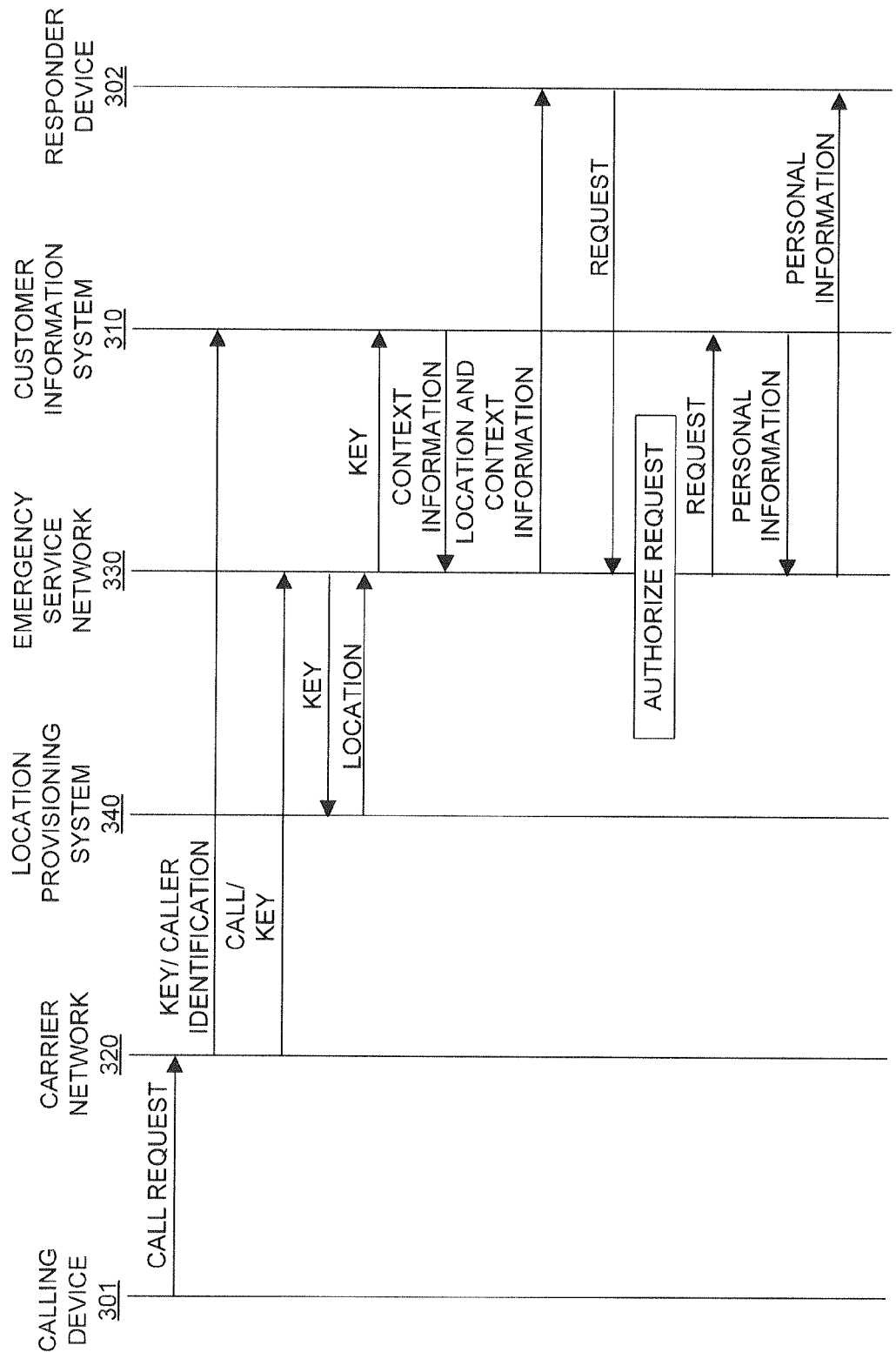
FIG. 5 illustrates a call flow diagram in an embodiment of the invention.

FIG. 5 is another call flow diagram that illustrates the operation of communication network 300 in another embodiment of the invention. A caller operating device 301 places a call to an emergency service, such as by dialing 9-1-1. Device 301 transmits a call request to carrier network 320 that identifies the requested service and includes a caller identification. In some cases, the caller identification identifies a phone number associated with the calling device 301 utilized by the caller. In other cases, the caller identification could identify the caller by a network address, a username, or the like.

In response to the call request, carrier network 320 selects a key to use to track the call. In an example, the key identifies calling device 301. In another example, the key identifies access equipment utilized by calling device 301 to access carrier network 320, such as a modem or a terminal adapter system.

Carrier network 320 transmits a message to customer information system 310 that indicates both the key and the caller identification. Customer information system 310 receives and processes the message to select context information associated with the caller identification. Customer information system 310 then stores the key in association with the selected context information.

Carrier network 320 also transfers the call and signaling for the call to emergency service network 330. The signaling for the call identifies the key selected by carrier network 320 to track the call.

Emergency service network 330 responsively transfers a location request to location provisioning system 340. The location request identifies the key. Location provisioning system 340 processes the key to determine the location of calling device 301. For example, location provisioning system 340 could store a database having various device identifiers, such as media access control (MAC) addresses, stored in association with geographic locations. Upon determining the location of calling device 301, location provisioning system 340 returns the location to emergency service network 330.

Emergency service network 330 also transmits a request to customer information system 310 indicating the key. Customer information system 310 processes the request to determine the caller identification associated with the key. Upon determining the proper caller identification, customer information system 310 retrieves the context information associated with the caller identification and transmits the context information to emergency service network 330.

Emergency service network 330 eventually possesses both the location of calling device 301 and context information associated with the caller. Emergency service network 330 then transfers the location and the context information to the responder device 302 operated by the response personnel responding to the emergency.

Responder device 302 subsequently reads a personal identification from an identification device located on or with the person 304. Responder device 302 could directly read or scan the personal identification. Optionally, a second device could read or scan the personal identification and communicate the personal identification to responder device 302. For instance, a bar code scanner could be utilized to scan a bar code for a personal identification and transfer the identification to responder device 302 over a well known communication link.

Upon receiving the personal identification, responder device 302 transfers a request for personal information to emergency service network 330. This request includes the personal identification. In this example, personal information is considered information associated with the person that is the subject of the emergency call. Emergency service network 330 receives and processes the request to determine if responder device 302 is allowed to make the request.

As discussed above with respect to FIG. 4, in one example emergency service network 330 processes the location of responder device 302 with the location of calling device 301 to determine if responder device 302 is proximate to calling device 301. Responder device 302 is allowed if proximate to calling device 301. Responder device 302 could be denied the request if not proximate to calling device 301.

In another example, emergency service network 330 initiates a timer upon receiving the emergency call. The request by responder device 302 is allowed if made within the window of time. The request is denied if made after the window of time has expired.

If responder device 302 is allowed to make the request, emergency service network 300 transfers a request to customer information system 310 indicating the personal identification. Customer information system 310 processes the request to retrieve the personal information associated with personal identification. Customer information system 310 then transmits the personal information to emergency service network 330. Emergency service network 330 forwards the personal information to responder device 302.

In an alternative, emergency service network queries customer information system 310 to determine if the personal information requested by responder device 302 is allowed. Customer information system 310 sets a timer upon receiving the key and caller identification from carrier network 320. Any requests for personal information are allowed if made before the expiration of the timer. For instance, customer information system 310 may set a ten minute window upon receiving the key and caller identification from carrier network 320 within which any requests for personal information are granted. If the request by emergency service network 330 is made within the time limit, customer information system 310 provides the personal information accordingly. If the request is not made within the time limit, customer information system 310 provides a denial to emergency service network 330. In such a case, emergency service network 330 considers the request by responder device 302 as not allowed and returns a denial accordingly.

In another alternative embodiment, responder device 302 directly interfaces with customer information system 310. Responder device 302 transmits its request for personal information directly to customer information system 310, rather than query emergency service network 330 for the information. In such an embodiment, customer information system 310 determines if the request for personal information by responder device 302 is allowed. Customer information system 310 sets a timer upon receiving the key and caller identification from carrier network 320. Any requests for personal information are allowed if made before the expiration of the timer.

As shown in FIG. 4 and FIG. 5, responder device 302 can advantageously obtain both the location of calling device 301 and context information associated with the caller from emergency service network 330. Such context information improves the ability of a first responder operating responder device 302 to respond to the emergency. The context information also reduces risks to the first responder. In another advantage, the same key used to obtain location information can be used to obtain the context information.

In another advantage, responder device 302 can obtain personal information associated with the person 304 that is the subject of the emergency call placed by the caller 303. In yet another advantage, the privacy of this personal information is protected by emergency service network 330 or customer information system 310 verifying that a request for the personal information is allowed.

Figure 6:
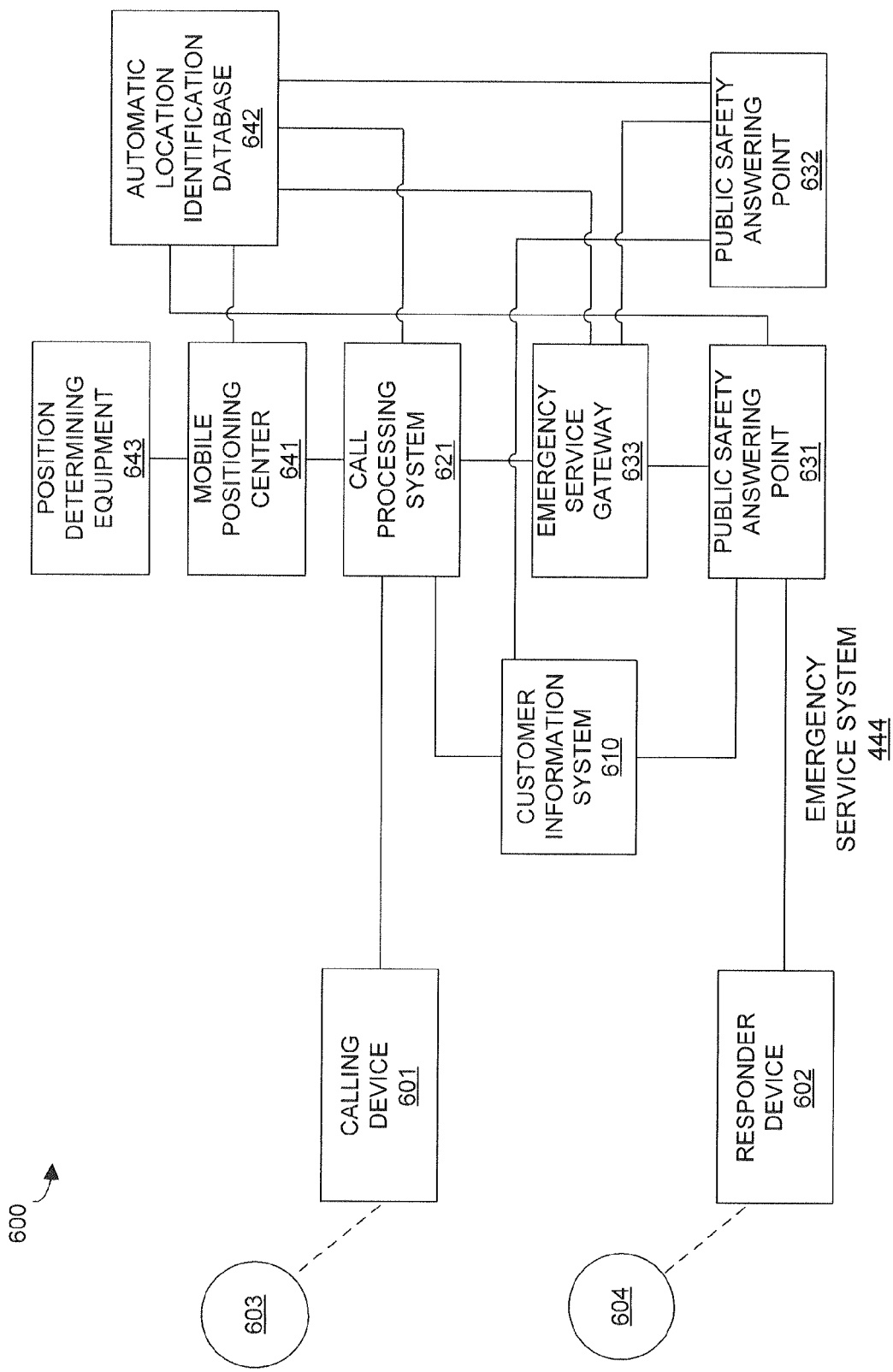
FIG. 6 illustrates a communication network in an embodiment of the invention.

FIG. 6 illustrates a communication network 600 in an embodiment of the invention. Communication network 600 includes calling device 601, call processing system 621, emergency service gateway 633, public safety answering point (PSAP) 631, PSAP 632, mobile positioning center 641, positioning determining equipment 643, automatic location identification (ALI) database 642, customer information system 610, and responder device 602.

Calling device 601 is connected to call processing system 621. Call processing system 621 is connected to emergency service gateway 633, customer information system 610, mobile positioning center 641, and ALI database 642. Emergency service gateway 633 is connected to call processing system 621, PSAP 631, and PSAP 632. PSAP 631 is connected to emergency service gateway 633, customer information system 610, ALI database 642, and responder device 602. Likewise, PSAP 632 is connected to emergency service gateway 633, customer information system 610, and ALI database 642. Mobile positioning center 641 is connected to position determining equipment 643, call processing system 621, and ALI database 642. Position determining equipment 643 is connected to mobile positioning center 641. Responder device 602 is connected to PSAP 631. ALI database 642 is connected to PSAP 631, PSAP 632, call processing system 621, mobile positioning center 641, and emergency service gateway 633. Customer information system 610 is connected to call processing system 621, PSAP 631, and PSAP 632.

Calling device 601 is any device capable of placing emergency calls to call processing system 621, such as a telephone, mobile phone, or a personal computer, as well as other types of calling devices.

Call processing system 621 is any system or collection of systems capable of receiving and processing emergency calls from calling device 601 to connect the calls to emergency service gateway 633. Examples of call processing systems include, but are not limited to, mobile switching centers, soft switches, or circuit switched telephony switches. Other types of call processing systems are possible. Call processing system 621 is also capable of communicating with mobile positioning center 641, ALI database 642, emergency service gateway 633, calling device 601, and customer information system 610.

Mobile positioning center 641 is any system or collection of systems capable of receiving and processing queries from call processing system 621 to select keys for correlating information on emergency calls. Mobile positioning center 641 is further capable of communicating with position determining equipment to locate callers for emergency service calls. Mobile positioning center 641 also communicates with ALI database 642, including exchanging queries and responses to determine the location of callers.

Emergency service gateway 633 is any system or collection of systems capable of communicating with ALI database 642 to select appropriate public safety answering points to handle emergency calls. Emergency service gateway 633 is further capable of communicating with PSAP 631 and PSAP 632, including connecting calls and transferring call signaling to PSAP 631 and PSAP 632. In an embodiment, emergency service gateway 633 could be a selective router.

PSAP 631 is any system or collection of systems capable of terminating emergency calls placed by calling device 601. PSAP 631 is capable of receiving the calls and associated signaling from emergency service gateway 633. PSAP 631 is further capable of exchanging communications, such as queries and responses, with ALI database 642 to determine the location of callers. PSAP 631 is also capable of communicating with customer information system 610 and responder device 602.

PSAP 632 is any system or collection of systems capable of terminating emergency calls placed by calling device 601. PSAP 632 is capable of receiving the calls and associated signaling from emergency service gateway 633. PSAP 632 is further capable of exchanging communications, such as queries and responses, with ALI database 642 to determine the location of callers. PSAP 632 is also capable of communicating with customer information system 610 and with other responder devices (not shown).

Customer information system 610 is any system capable of storing information for a person in association with an identifier for that person, such as a caller identification, a personal identification, or the like. Customer information system 610 can store individual files, documents, or records, as well as other types of data or information, for multiple people. Each individual item of information, whether a file, a document, a record, or the like, can be stored in association with an identifier.

Responder device 602 could be any device, such as a mobile phone, a laptop computer, or a tablet computer, capable of communicating with PSAP 631. Responder device 602 could communicate with PSAP 631 in a manner well known in the art, such as via a data link, a messaging system, or the like.

Figure 7:
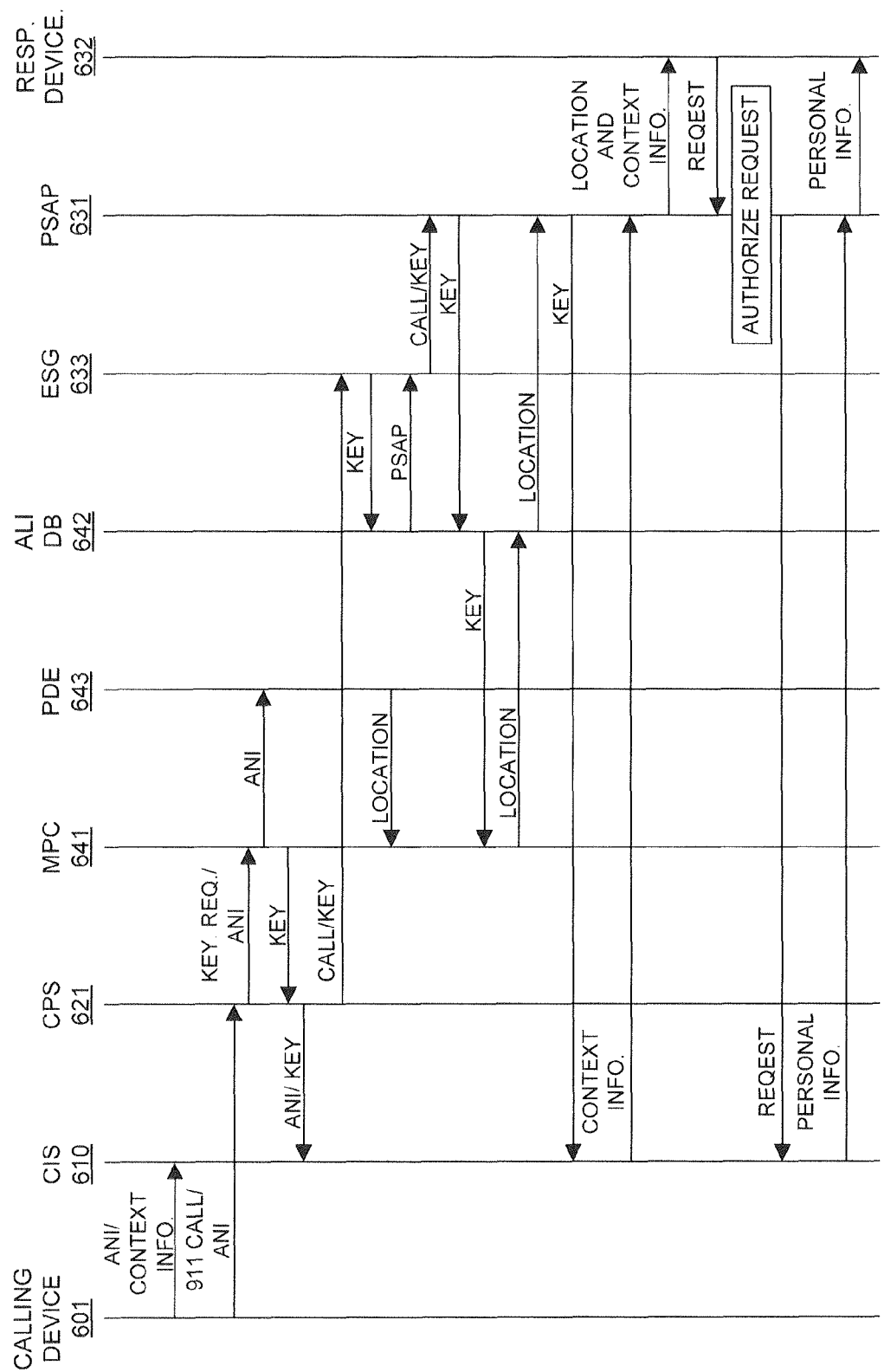
FIG. 7 illustrates a call flow diagram in an embodiment of the invention.

FIG. 7 is a call flow diagram illustrates the operation of communication network 600 in an embodiment of the invention. Early in operation, users input information to customer information system 610. The information could be, for example, health or medical information for the user or other users, or information pertaining to the physical dwelling where the user resides. Other types of information are possible.

During the input process, the user provides an identifier in association with which customer information system 610 stores the information. In one example, a phone number for calling device 601, or the automatic number identification (ANI), is provided to customer information system 610 as an identifier. In another example, a user provides a personal identification that identifies the person. The users could connect to customer information system 610 via any well known communication interface.

Later, a caller 603 using calling device 601 places a call to an emergency service to obtain emergency assistance for another person 604, such as by dialing 9-1-1. Calling device 601 transmits a call request to call processing system 621. The call request indicates the dialed digits as well as the ANI for calling device 601.

In response, call processing system 621 transmits a key request to mobile positioning center 641 that identifies the ANI. Mobile positioning center 641 processes the ANI to select a key from among a group of keys. The key is used henceforth for information correlation on the call. Mobile positioning center 641 returns a response to call processing system 631 with the key. Mobile positioning center 641 also transfers the ANI to position determining equipment 643. Position determining equipment 643 initiates a location determination process to determine the location of calling device 601 utilizing the ANI. Position determining equipment 643 returns the location of calling device 601 to mobile positioning center 641. Mobile positioning center 641 stores the location in association with the key.

Upon receiving the key, call processing system 621 transmits a message to customer information system 610 that indicates both the ANI and the key for the call. Customer information system 610 processes the ANI to determine information associated with the ANI. Upon finding the information, customer information system 610 stores the key in association with the information. In this example, information associated with the ANI and stored in association with the key is considered context information.

Call processing system 621 eventually transfers the call and signaling for the call to emergency service gateway 633. The signaling for the call identifies the key. Emergency service gateway 633 responsively transmits a PSAP request to ALI database 642 that indicates the key. ALI database 642 processes the key to select the appropriate PSAP for the call from PSAP 631 and 632. ALI database 642 returns a response indicating PSAP 631 to emergency service gateway 633. Emergency service gateway 633 transfers the call and signaling for the call to PSAP 631. The key is also included in this signaling.

Upon receiving the call and the key, PSAP 631 transfers a location request to ALI database 642 that indicates the key. ALI database 642 forwards the location request, or another corresponding message, to mobile positioning center 641.

Upon receiving the location request, mobile positioning center 641 looks-up the location of calling device 601 based on the key and returns the location to ALI database 642. ALI database 642 responsively returns the location of calling device 601 in a message to PSAP 631.

In order to respond to the emergency call, PSAP 631 transfers a context request to customer information system 610. The context request indicates the key. Customer information system 610 processes the key to determine the context information associated with the key. Customer information system 610 returns the selected context information to PSAP 631. PSAP 631 then transfers both the location of calling device 601 and the context information associated with the caller to responder device 602.

Responder device 602 then reads a personal identification from an identification device located on or with the person 604. Responder device 602 could directly read or scan the personal identification. Optionally, a second device could read or scan the personal identification and communicate the personal identification to responder device 602. For instance, a bar code scanner could be utilized to scan a bar code for a personal identification and transfer the identification to responder device 602 over a well known communication link.

Upon receiving the personal identification, responder device 602 transfers a request for personal information to PSAP 631. This request includes the personal identification. In this example, personal information is considered information associated with the subject of the emergency call, person 604.

PSAP 631 receives and processes the request to determine if responder device 602 is allowed to make the request. In one example, the request identifies the location of responder device 602. PSAP 631 processes the location of responder device 602 with the location of calling device 601 to determine if responder device 602 is proximate to calling device 601. Responder device 602 could be considered proximate to calling device 601 if within a certain distance from the current location of calling device 601. Optionally, responder device 602 could be considered proximate to calling device 601 if within a certain distance of the past location of calling device 602 when the emergency call was placed. Responder device 602 is allowed if proximate to calling device 601. Responder device 602 could be denied the request if not proximate to calling device 601.

If responder device 602 is allowed to make the request, PSAP 631 transfers a request to customer information system 610 indicating the personal identification. Customer information system 610 processes the request to retrieve the personal information associated with personal identification. Customer information system 610 then transmits the personal information to PSAP 631. PSAP 631 forwards the personal information to responder device 602.

Figure 8:
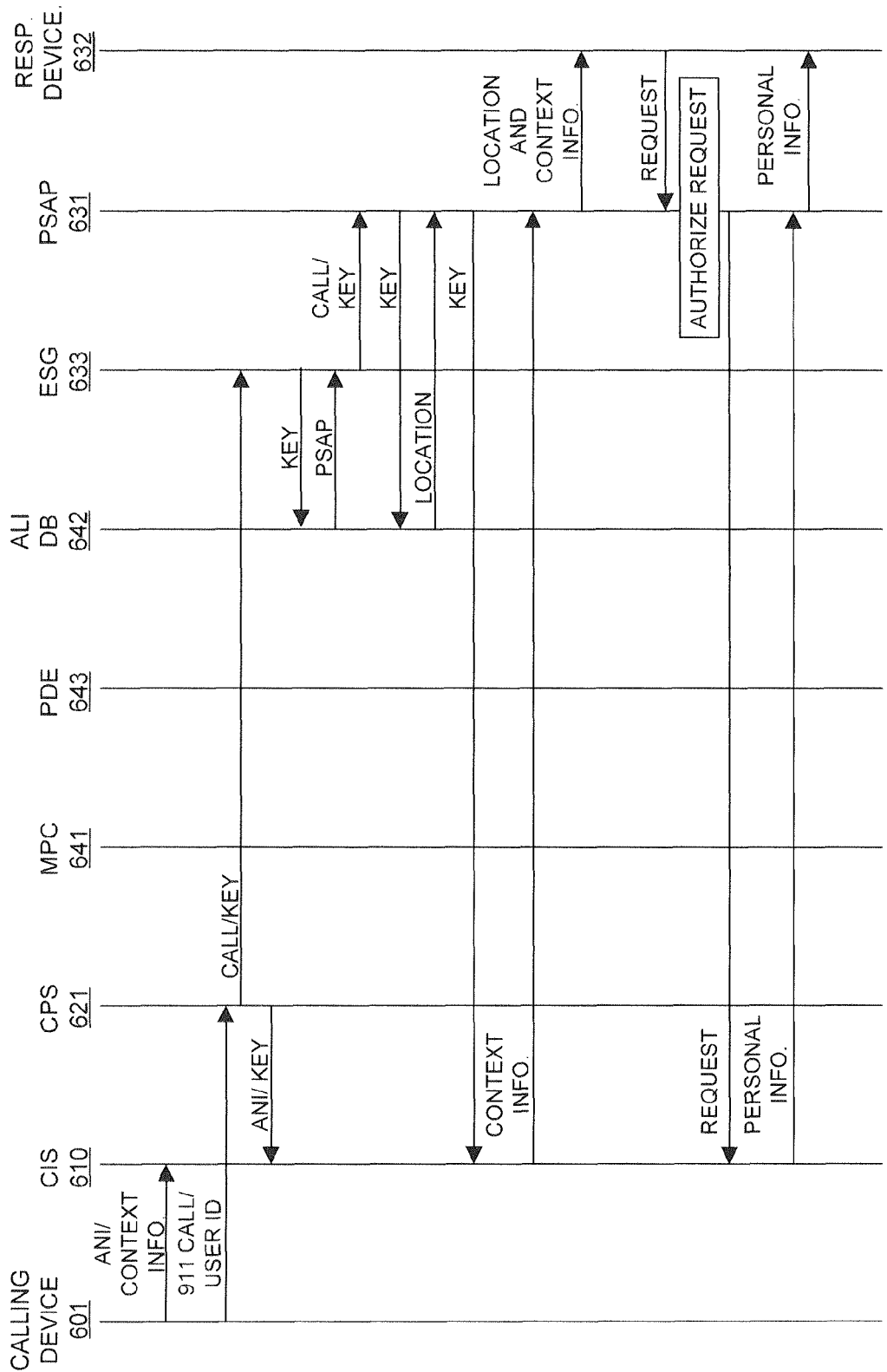
FIG. 8 illustrates a call flow diagram in an embodiment of the invention.

FIG. 8 is another call flow diagram that illustrates the operation of communication network 600 in an embodiment of the invention. A caller using calling device 601 places a call for an emergency service, such as by dialing 9-1-1. Calling device 601 transmits a call request to call processing system 621. The all request indicates the dialed digits as well as the ANI for calling device 601.

In response, call processing system 621 selects a key to use henceforth for information correlation. In an example, the key identifies calling device 601 or access equipment utilized by calling device 601 to place the call, such as a modem or terminal adapter system.

Upon selecting the key, call processing system 621 transmits a message to customer information system 610 that indicates both the ANI and the key for the call. Customer information system 610 processes the ANI to determine information associated with the ANI. Upon finding the information, customer information system 610 stores the key in association with the information. In this example, the information associated with the ANI and stored in association with the key is considered context information.

Call processing system 621 also transfers the call and signaling for the call to emergency service gateway 633. The signaling for the call identifies the key. Emergency service gateway 633 responsively transmits a PSAP request to ALI database 642 that indicates the key. ALI database 642 processes the key to select the appropriate PSAP for the call from PSAP 631 and 632. ALI database 642 returns a response indicating PSAP 631 to emergency service gateway 633. Emergency service gateway 633 transfers the call and signaling for the call to PSAP 631. The key is also included in this signaling.

Upon receiving the call and the key, PSAP 631 transfers a location request to ALI database 642 that indicates the key. ALI database 642 looks-up the location of calling device 601 based on the key and responsively returns the location of calling device 601 in a message to PSAP 631. It should be understood that ALI database 642 could communicate with mobile processing center 641 to determine the location of calling device 601.

PSAP 631 also transfers a context request to customer information system 610. The context request indicates the key. Customer information system 610 processes the key to determine the context information associated with the key. Customer information system 610 returns the selected context information to PSAP 631. PSAP 631 then transfers both the location of calling device 601 and the context information associated with the caller to responder device 602.

Further in this embodiment, responder device 602 reads a personal identification from an identification device located on or with the person 604. Responder device 602 could directly read or scan the personal identification. Optionally, a second device could read or scan the personal identification and communicate the personal identification to responder device 602. For instance, a bar code scanner could be utilized to scan a bar code for a personal identification and transfer the identification to responder device 602 over a well known communication link.

Upon receiving the personal identification, responder device 602 transfers a request for personal information to PSAP 631. This request includes the personal identification. In this example, personal information is considered information associated with the subject of the emergency call, person 604.

PSAP 631 receives and processes the request to determine if responder device 602 is allowed to make the request. In one example, the request identifies the location of responder device 602. PSAP 631 processes the location of responder device 602 with the location of calling device 601 to determine if responder device 602 is proximate to calling device 601. Responder device 602 is allowed if proximate to calling device 601. Responder device 602 could be denied the request if not proximate to calling device 601.

If responder device 602 is allowed to make the request, PSAP 631 transfers a request to customer information system 610 indicating the personal identification. Customer information system 610 processes the request to retrieve the personal information associated with personal identification. Customer information system 610 then transmits the personal information to PSAP 631. PSAP 631 forwards the personal information to responder device 602.

In an alternative, PSAP 631 queries customer information system 610 to determine if the personal information request by responder device 602 is allowed. Customer information system 610 sets a timer upon receiving the key and caller identification from call processing system 621. Any requests for personal information are allowed if made before the expiration of the timer. Any requests for personal information are denied if made after the expiration of the timer. If the request by PSAP 631 is made within the time limit, customer information system 610 provides the personal information accordingly. If the request is not made within the time limit, customer information system 610 provides a denial to PSAP 631. In such a case, PSDAP 631 considers the request by responder device 602 as not allowed and returns a denial accordingly.

In another alternative, responder device 602 directly interfaces with customer information system 610 to obtain the personal information, rather than query PSAP 631 for the personal information. In such an embodiment, customer information system 610 determines if the request for information by responder device 602 is allowed. Customer information system 610 sets a timer upon receiving the key and caller identification from carrier network 620. Any requests for personal information are allowed if made before the expiration of the timer.

As shown by FIG. 7 and FIG. 8, a first responder operating responder device 602 can obtain both location information and context information from PSAP 631. The context information, in addition to the location information, improves the emergency response provided to callers and reduces risks to first responder personnel. In another advantage, the same key used to obtain location information can be used to obtain the context information.

In another advantage, responder device 602 can personal information associated with the person 604 that is the subject of the emergency call placed by the caller 603. In yet another advantage, the privacy of the personal information is protected by verifying that responder device 602 is allowed to request the information.

Figure 9:
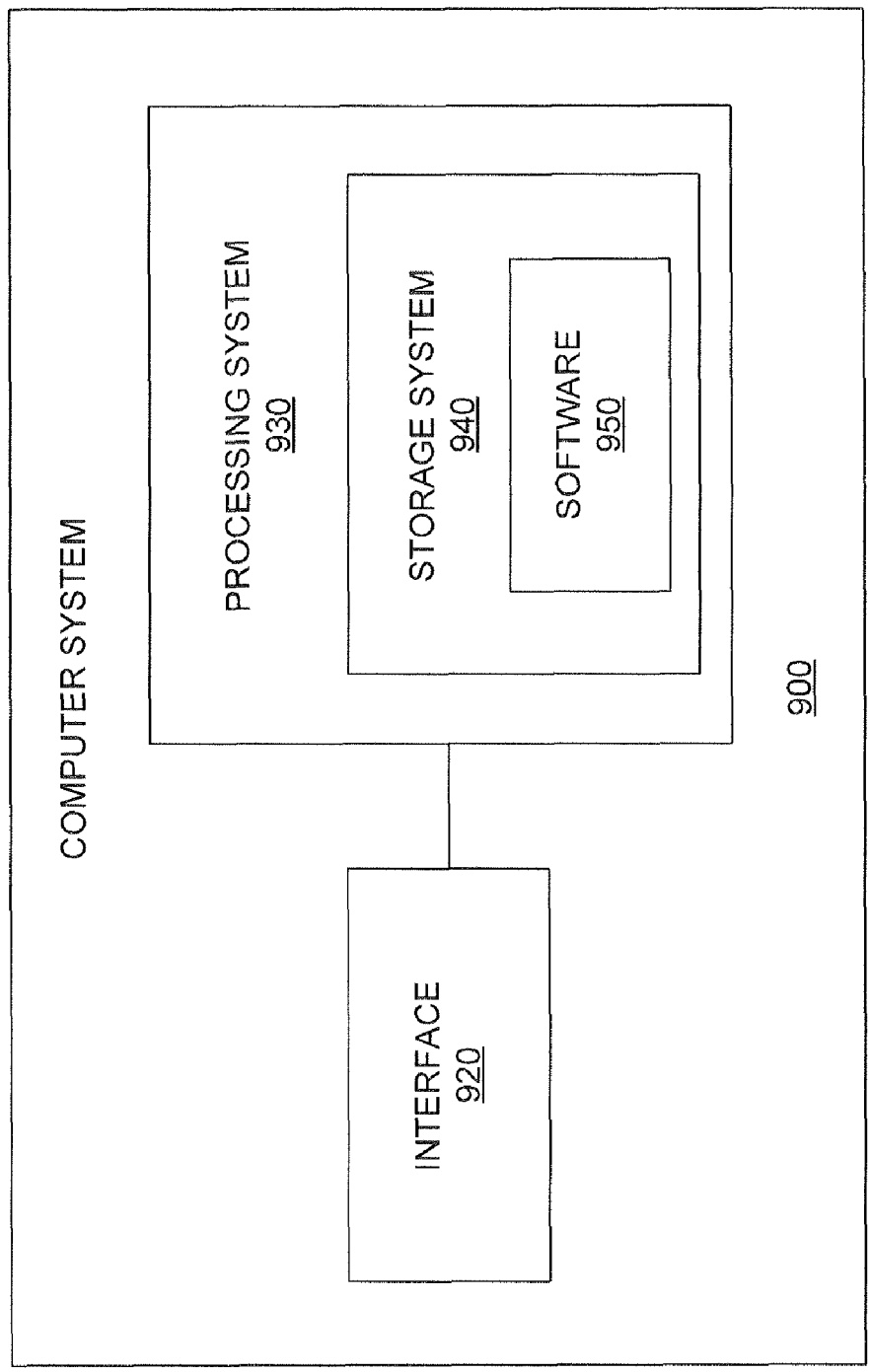
FIG. 9 illustrates a computer system in an embodiment of the invention.

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Interface 920 may be distributed among multiple communication devices. Processing system 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described herein for the elements of communication networks 100, 300, and 600, such as calling devices 101, 301, and 601, responder devices 102, 302, and 602, emergency service system 125, customer information systems 310 and 610, emergency service network 330, call processing system 621, and PSAPs 631 and 632.

We claim:

1. A communication network for handling emergency service calls comprising:
    a responder device configured to receive a personal identification that identifies a person and transmit a personal information request for personal information associated with the person wherein the personal information request includes the personal identification; and
    an emergency service system configured to receive a call transmitted from a calling device to an emergency service to obtain assistance for the person, receive the personal information request from the responder device, determine if the responder device is authorized to request the personal information, and transfer the personal information to the responder device if the responder device is authorized;
    wherein to determine if the responder device is authorized to request the personal information, the emergency service system is configured to determine a location of the call and process the location of the call to determine if the responder device is proximate to the location of the call, wherein the responder device is authorized to request the personal information if the responder device is proximate to the location of the call, and wherein the emergency service system is configured to deny the personal information request if the responder device is not proximate to the location of the call.

2. The communication network of claim 1 wherein the emergency service system is configured to set a time limit in response to receiving the call, and wherein, to determine if the responder device is authorized to request the personal information, the emergency service system is configured to determine if the personal information request is received within the time limit, wherein the responder device is authorized if the personal information request is received within the time limit, and wherein the emergency service system is configured to deny the personal information request if the personal information request is not received within the time limit.

3. The communication network of claim 1 wherein the emergency service system comprises a public safety answering point and a customer information system, wherein the public safety answering point receives the call, receives the personal information request, and transfers the personal information to the responder device if the responder device is authorized.

4. The communication network of claim 3 wherein the public safety answering point is configured to transfer another personal information request to the customer information system and receive the personal information from the customer information system in response to the other personal information request.

5. The communication network of claim 4 wherein the public safety answering point determines if the responder device is authorized to request the personal information.

6. The communication network of claim 4 wherein the customer information system determines if the responder device is authorized to request the personal information.

7. The communication network of claim 3 wherein the public safety answering point is configured to transfer a context information request to the customer information system, receive the context information from the customer information system in response to the context information request, and transfer the context information to the responder device, wherein the context information is associated with the calling device and is not associated with the person.

8. The communication network of claim 1 wherein the responder device, to receive the personal identification, is configured to read the personal identification from an identification device located on the person, wherein the identification device comprises a radio frequency identification chip, a bar code, or a magnetic strip.

9. A method of operating communication network for handling emergency service calls, the method comprising:
    receiving in a responder device a personal identification that identifies a person;
    transmitting a personal information request for personal information associated with the person from the responder device wherein the personal information request includes the personal identification;
    receiving a call into an emergency service system transmitted from a calling device to an emergency service to obtain assistance for the person;
    receiving the personal information request into the emergency service system;
    in the emergency service system, determining if the responder device is authorized to request the personal information; and
    transferring the personal information from the emergency service system to the responder device if the responder device is authorized;
    wherein determining if the responder device is authorized to request the personal information comprises determining a location of the call and processing the location of the call to determine if the responder device is proximate to the location of the call, wherein the responder device is authorized to request the personal information if the responder device is proximate to the location of the call, and wherein the personal information request is denied if the responder device is not proximate to the location of the call.

10. The method of claim 9 further comprising, in the emergency service system, setting a time limit in response to receiving the call, and wherein determining if the responder device is authorized to request the personal information comprises determining if the personal information request is received within the time limit, wherein the responder device is authorized if the personal information request is received within the time limit, and wherein the personal information request is denied if the personal information request is not received within the time limit.

11. The method of claim 9 wherein the emergency service system comprises a public safety answering point and a customer information system, the method comprising receiving the call in the public safety answering point, receiving the personal information request in the public safety answering point, and transferring the personal information from the public safety answering point to the responder device if the responder device is authorized.

12. The method of claim 11 further comprising transferring another personal information request from the public safety answering point to the customer information system and receiving the personal information in the public safety answering point from the customer information system in response to the other personal information request.

13. The method of claim 12 comprising determining if the responder device is authorized to request the personal information in the public safety answering point.

14. The method of claim 12 comprising determining if the responder device is authorized in the customer information system.

15. The method of claim 11 further comprising transferring a context information request from the public safety answering point to the customer information system, receiving the context information in the public safety answering point from the customer information system in response to the context information request, and transferring the context information from the public safety answering point to the responder device, wherein the context information is associated with the calling device and is not associated with the person.

16. The method of claim 9 wherein receiving the personal identification comprises reading the personal identification from an identification device located on the person, wherein the identification device comprises a radio frequency identification chip, a bar code, or a magnetic strip.

17. A method of operating a public safety answering point for handling emergency service calls, the method comprising:
  receiving a call transmitted from a calling device to an emergency service to obtain assistance for a person;
  receiving from a responder device a personal information request for personal information associated with the person, wherein the personal information request includes a personal identification read by the responder device that identifies the person;
  determining if the responder device is authorized to request the personal information; and
  transferring the personal information to the responder device if the responder device is authorized;
  wherein determining if the responder device is authorized to request the personal information comprises determining a location of the call and processing the location of the call to determine if the responder device is proximate to the location of the call, wherein the responder device is authorized to request the personal information if the responder device is proximate to the location of the call, and wherein the personal information request is denied if the responder device is not proximate to the location of the call.

* * * * *